Nov. 24, 1964     J. P. LANIGAN, JR., ET AL     3,158,244
REVERSIBLE DOUBLE-DRIVE CLUTCH
Filed Nov. 29, 1962

INVENTORS
JAMES P. LANIGAN, JR.
EUGENE F. WALLACE
JAMES I. KOTTER
HAROLD L. SALAUN, JR.

BY R. Hoffman
ATTORNEY

United States Patent Office 3,158,244
Patented Nov. 24, 1964

3,158,244
REVERSIBLE DOUBLE-DRIVE CLUTCH
James P. Lanigan, Jr., Metairie, Eugene F. Wallace, Chalmette, and James I. Kotter and Harold L. Salaun, Jr., Metairie, La., assignors to the United States of America as represented by the Secretary of Agriculture
Filed Nov. 29, 1962, Ser. No. 241,080
1 Claim. (Cl. 192—43)
(Granted under Title 35, U.S. Code (1952), sec. 266)

A non-exclusive, irrevocable royalty-free license in the invention herein described, for all governmental purposes, throughout the world, with the power to grant sublicenses for such purposes, is hereby granted to the Government of the United States of America.

This invention provides a mechanical apparatus whereby a single driving source can be caused to shift its driving torque from a first driven system (component) to a second driven system by changing the direction of rotation of the driving source.

With the great expanse of machinery development and the continued increase of industrial automation, the need for a reversible double-drive clutch as described herein will be apparent to those skilled in the art of machinery design.

Conventional methods for operating two sequential low speed drive systems generally required either two separate driving sources, two separate clutches or some type transmission.

The apparatus of this invention permits one reversible source of driving torque to drive in sequence two independent systems. Reversing the source of driving torque, immediately disengages one system completely and allows same to free wheel as the other system becomes engaged and driven positively.

It is an object of this invention to provide a means for driving alternately two sequential systems.

Another object of this invention is to reduce the number of components necessary to accomplish two sequential drive operations.

Still another object of this invention is to provide a reversible double-drive clutch one embodiment of which includes clutch elements equipped with positive, non-slip, jaw-type teeth capable of transmitting high torque from the driving source to the driven systems at low speeds and with no loss in mechanical efficiency.

It will be obvious to those skilled in the art that the the transmission of torque between the several clutch members of this apparatus can be accomplished with means other than the toothed elements of the embodiment disclosed.

Friction type clutch facings, for example, can be employed to transmit relatively low torque.

The reversible double-drive clutch, according to the invention, is described in detail below reference being made to the accompanying drawings in which.

Figure 2:
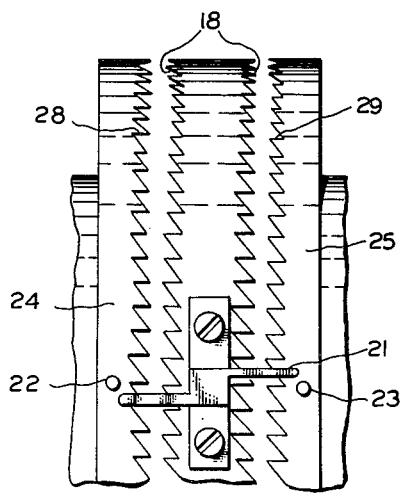
FIGURE 2 represents a partial plan view of the clutch assembly showing the indexing bar and pins.
Figure 1:
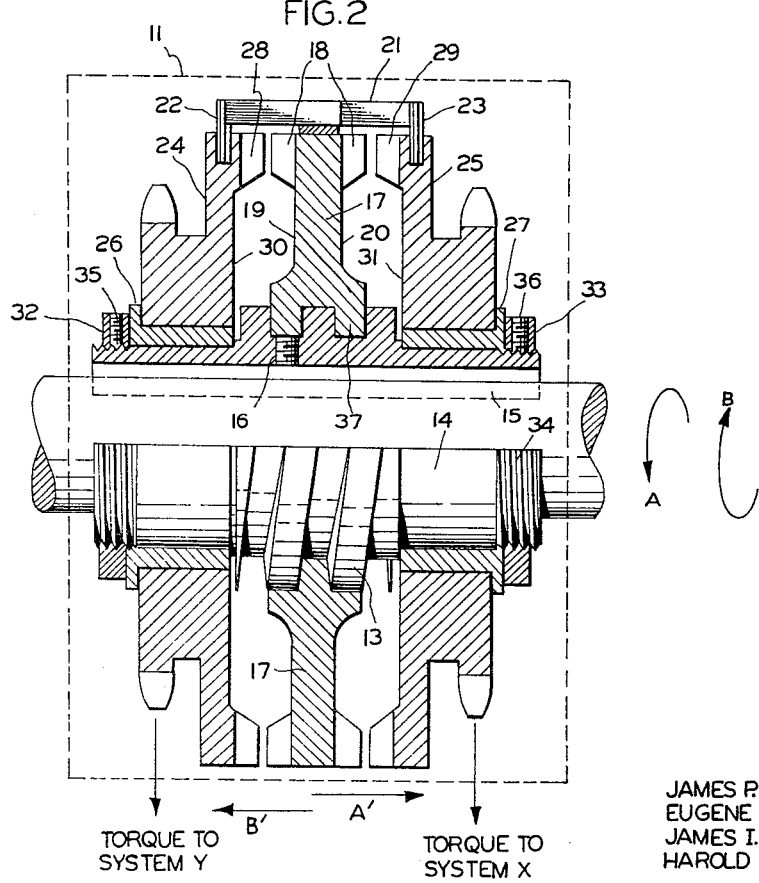
FIGURE 1 represents a partial cross-sectional view of the clutch assembly with the sleeve screw shown partially in full view and partially in cross-section.

Referring to the drawings, the reversible double-drive clutch assembly 11 is installed on drive shaft 12 which is connected to or is part of a reversible driving means such as an electrical motor. Screw threads 13 are constructed onto sleeve 14 which is securely fastened to shaft 12 by means of key 15 and set screw 16.

Toothed traveler 17, having teeth 18 constructed on the radial extremities of each of its faces 19 and 20, has internal threads 37 which match screw threads 13 of threaded sleeve 14. Directional movement of toothed traveler 17 is governed by directional rotation of sleeve 14 fastened to drive shaft 12. Indexing bar 21, made of slightly flexible material, is fastened to periphery of toothed traveler 17 and bears on either indexing pin 22 or indexing pin 23, depending on rotation of drive shaft 12.

Indexing pins 22 and 23 are fastened to and extend from periphery of toothed drive sprockets 24 and 25, respectively.

Toothed drive sprockets 24 and 25 are fitted with bushings 26 and 27, respectively, and are free to rotate on sleeve 14. Toothed drive sprockets 24 and 25 have teeth 28 and 29 located on the radial extremities of their inner faces 30 and 31, respectively.

Keeper nuts 32 and 33 are threaded to match threads 34 of sleeve 14 and are locked to sleeve 14 by set screws 35 and 36. The clutch is held in assembly by keeper nuts 32 and 33.

If toothed traveler 17 is in neutral position as shown, and drive shaft 12 starts to rotate in direction A, then toothed traveler 17 moves to position A' where its teeth 18 on its face 20 engage with teeth 29 of toothed drive sprocket 25. Toothed traveler 17 is guided into aligned engagement with toothed drive sprocket 25 by means of its indexing bar 21 bearing on indexing pin 23. Torque is transmitted from shaft 12 through traveler 17 to toothed drive sprocket 25 which drives a system X. As this occurs, indexing bar 21 flexes slightly allowing the load to shift from pin 23 to teeth 29 of sprocket 25.

When drive shaft 12 reverses, thereby rotating in direction B, toothed traveler 17 disengages toothed drive sprocket 25 and moves to location B' where it engages with toothed drive sprocket 24. Aligned engagement is accomplished by its indexing bar 21 bearing on indexing pin 22 of toothed drive sprocket 24. Upon disengagement, drive sprocket 25 is completely released, thereby allowing system X to move freely. Torque is transmitted from shaft through traveler to toothed drive sprocket 24 which drives system Y.

Where high rotational speed and/or relatively lower torque transmission is required, the reversible double-drive clutch may be equipped with friction disks in place of teeth 18, 28, and 29. The friction disks are thus located on faces 19 and 20 of traveler 17, and inner faces 30 and 31 of drive sprockets 24 and 25, respectively. With the use of friction disks the indexing guide 21 and the indexing pins 22 and 23 may be eliminated.

Where high torque transmission and/or ease of response is essential to a particular operation, the reversible double-drive clutch may incorporate a conventional ball screw in place of the corresponding standard screw threads 13 on sleeve 14 and toothed traveler 17. The ball screw enables instant release of engaging toothed traveler 17, especially where high load transmission is encountered.

Although the apparatus is described using sprockets as a means for transmitting motion to each of the systems, the successful performance of the invention is not so limited. Other means such as gears, timing belt pulleys, pulleys, et cetera, or any combination thereof may be incorporated.

We claim:
A reversible double-drive clutch comprising in combination:
(a) a driven shaft,
(b) a first clutch member, having an outer and an inner face and a peripheral edge, rotatably mounted on said shaft in fixed axial position,
    (1) said first clutch member generally disc shaped with toothed clutch elements integral the inner face and torque transfer elements integral the outer face,

(c) a second clutch member, having an outer and an inner face and a peripheral edge, rotatably mounted on said shaft in fixed axial position,
   (1) said second clutch member generally disc shaped with toothed clutch elements integral the inner face and torque transfer elements integral the outer face, (d) a third clutch member, having a central bore and a peripheral edge, mounted on said shaft between said first and said second clutch members,
   (1) said third clutch member generally disc shaped with toothed clutch elements integral each disc face,
   (2) said third clutch member movable axially on said driven shaft via a screw thread within the central bore of said third clutch member and matching screw thread integral the portion of the driven shaft intermediate the said first and second clutch members.

(e) indexing means to verify opposing tooth register relative facing elements of clutch members incipient to engagement consisting of
   (1) an indexing bar located on and extending axially from each side the peripheral edge of said third clutch member,
   (2) an indexing pin located on and extending radially from the peripheral edge of each of the said first clutch member and the said second clutch member, said indexing bar adapted to contact the indexing pin of a proximal adjacent clutch member and concurrently align opposing teeth of the facing clutch elements prior to engagement and said indexing bar adapted to clear the indexing pin of a distal adjacent clutch member, whereby rotation of the driven shaft in one direction urges via the screw thread mounting, the third clutch member into engagement with an adjacent clutch member to establish a drive path in a first direction from the driven shaft through the engaged clutch members to the torque transfer means of the engaged and adjacent clutch member and whereby reversing the rotation of the driven shaft disengages and moves the third clutch member from the proximal adjacent clutch member toward the distal adjacent clutch member and into engagement therewith to establish a drive path in a second and opposite direction from the driven shaft through the engaged clutch members to the torque transfer means of the engaged clutch member.

References Cited by the Examiner

UNITED STATES PATENTS

| | | | |
|---|---|---|---|
| 824,805 | 7/06 | Muller | 192—94 |
| 1,254,180 | 1/18 | Ward | 192—43 |
| 2,699,854 | 1/55 | Trout | 192—31 |

DAVID J. WILLIAMOWSKY, *Primary Examiner.*